US012688372B2

(12) United States Patent
Grammer et al.

(10) Patent No.: US 12,688,372 B2
(45) Date of Patent: Jul. 21, 2026

(54) DEVICES, SYSTEMS, AND METHODS FOR INTELLIGENT DETERMINATION OF CONVERSATIONAL INTENT

(71) Applicant: Calabrio, Inc., Minneapolis, MN (US)

(72) Inventors: Skyler Grammer, Minneapolis, MN (US); Dylan Morgan, Minneapolis, MN (US); Paul Gordon, Minneapolis, MN (US); Chris Vanciu, Isle, MN (US); Kyle Smaagard, Forest Lake, MN (US); Matt Matsui, Minneapolis, MN (US); Boris Chaplin, Medina, MN (US)

(73) Assignee: Calabrio, Inc., Minneapolis, MN (US)

( * ) Notice: Subject to any disclaimer, the term of this patent is extended or adjusted under 35 U.S.C. 154(b) by 488 days.

(21) Appl. No.: 17/724,410

(22) Filed: Apr. 19, 2022

(65) Prior Publication Data

US 2022/0335225 A1 Oct. 20, 2022

Related U.S. Application Data

(60) Provisional application No. 63/176,766, filed on Apr. 19, 2021.

(51) Int. Cl.
*G06F 40/35* (2020.01)
*G06F 16/3329* (2025.01)
*G06F 40/205* (2020.01)

(52) U.S. Cl.
CPC .......... *G06F 40/35* (2020.01); *G06F 16/3329* (2019.01); *G06F 40/205* (2020.01)

(58) Field of Classification Search
None
See application file for complete search history.

(56) References Cited

U.S. PATENT DOCUMENTS

| | | | |
|---|---|---|---|
| 10,764,431 B1 * | 9/2020 | Pham .................. | H04M 3/5166 |
| 2013/0311181 A1 * | 11/2013 | Bachtiger ............. | G06F 16/345 |
| | | | 704/235 |
| 2020/0004878 A1 * | 1/2020 | Beaumont ............. | G06F 16/685 |

(Continued)

FOREIGN PATENT DOCUMENTS

WO 2016/109366 A1 7/2016

OTHER PUBLICATIONS

Balodis et al., "Intent Detection System Based on Word Embeddings", Artificial Intelligence: Methodology, Systems, and Applications, Aug. 29, 2018, pp. 25-35.

(Continued)

*Primary Examiner* — Nafiz E Hoque

(57) ABSTRACT

Disclosed herein are devices, systems, and computer-implemented methods for intelligent conversational intent detection. Example methods include acquiring a conversational transcript input that is requested for intent detection, inputting the conversational transcript input into a model configured to decipher a conversational intent segment, and returning to a user the conversational intent segment. The conversational transcript input can include one or more conversational transcript segments. The conversational intent segment can correspond to which of the one or more conversational transcript segments is likely to indicate a conversational intent of the conversational transcript input based on the intent detection.

18 Claims, 2 Drawing Sheets

(56) References Cited

U.S. PATENT DOCUMENTS

| | | | | |
|---|---|---|---|---|
| 2021/0084145 A1* | 3/2021 | Pham | .................. | H04M 3/5175 |
| 2021/0201238 A1* | 7/2021 | Sekar | .................. | G10L 15/1815 |
| 2022/0301558 A1* | 9/2022 | Carmeli | ............. | G10L 15/1822 |
| 2022/0391591 A1* | 12/2022 | Ronen | ................... | G06F 40/284 |
| 2023/0223016 A1* | 7/2023 | Konam | ................ | G06F 40/284 |
| | | | | 704/231 |

OTHER PUBLICATIONS

International Preliminary Report on Patentability received for PCT Patent Application No. PCT/US22/25431, mailed on Nov. 2, 2023, 7 pages.
International Search Report and Written Opinion received for PCT Patent Application No. PCT/US22/025431, mailed on Jul. 22, 2022, 9 pages.

\* cited by examiner

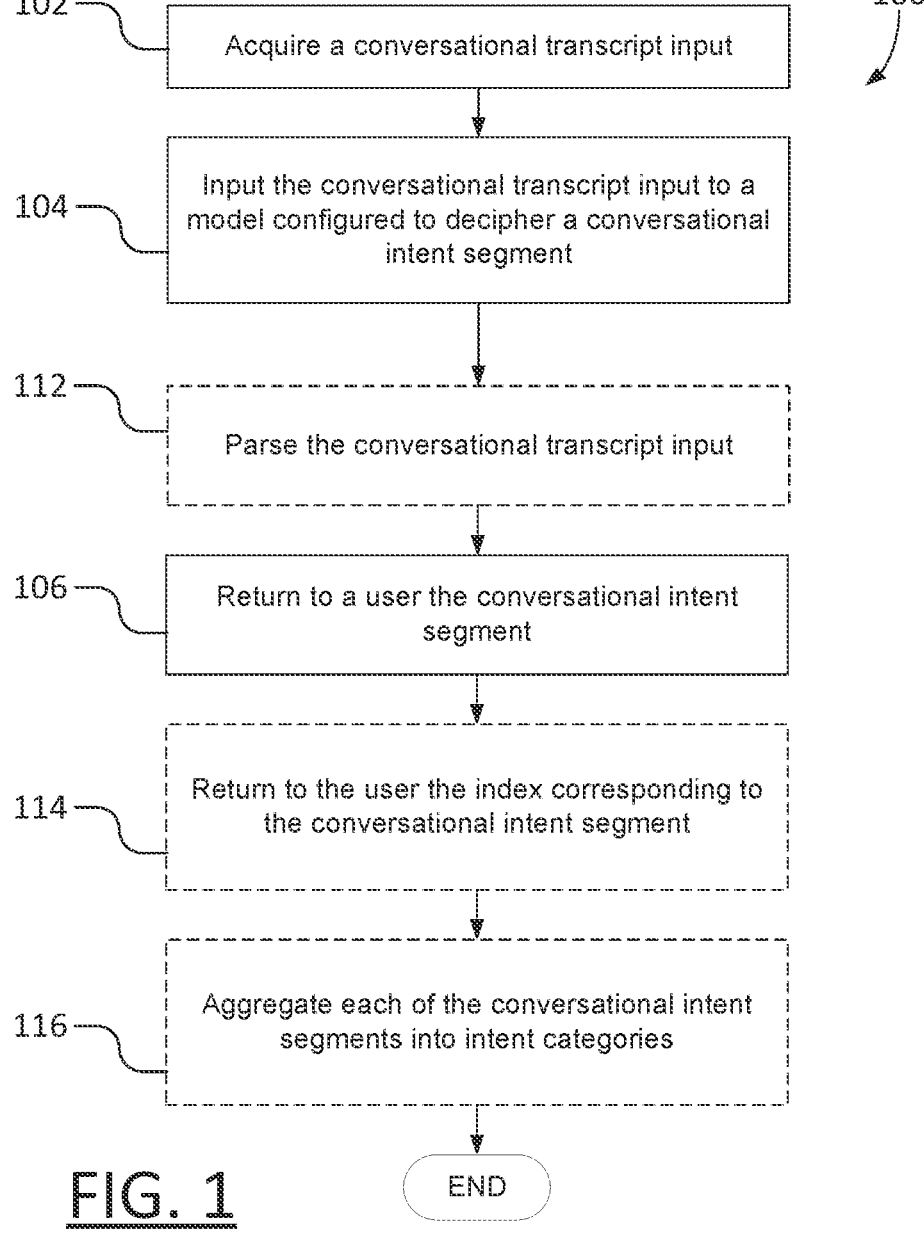

102 — Acquire a conversational transcript input

100

104 — Input the conversational transcript input to a model configured to decipher a conversational intent segment 112 — Parse the conversational transcript input 106 — Return to a user the conversational intent segment 114 — Return to the user the index corresponding to the conversational intent segment 116 — Aggregate each of the conversational intent segments into intent categories

END

FIG. 1

DEVICES, SYSTEMS, AND METHODS FOR INTELLIGENT DETERMINATION OF CONVERSATIONAL INTENT

CROSS-REFERENCE TO RELATED APPLICATION

This application claims priority to U.S. Provisional Application No. 63/176,766, filed Apr. 19, 2021, which is herein incorporated by reference in its entirety.

FIELD OF THE DISCLOSURE

The present invention relates to the field of computer technologies, and particularly, to devices, systems, and methods for intelligent conversational intent detection.

BACKGROUND

Contact centers manage omnichannel customer interactions from patrons. Some channels managed by contact centers include telephone (e.g., VoIP call), email, text, chat, and website interface services in which an agent interacts with the customer. The omnichannel nature of contact centers, however, results in large amounts of data from the customer interactions. Many contact centers employ tools before, during, and after customer interactions, for example, to help resolve customer issues (e.g., by managing call queues and automatic responses), to track customer interactions, to capture customer interaction and engagements, and to develop and analyze performance data. In many of these instances, albeit a cumbersome task, determining a customer's intent during an interaction is understandably helpful. But many existing tools employ fairly binary logic as with most computer-implemented tools and, thus, deciphering and organizing data within its context remains a challenge. In addition, despite an emergence of incorporating natural language processing (NLP) techniques to program computers to process and analyze large amounts of natural language data, such challenges persist.

Traditional methods of NLP require time-intensive and unreliable techniques. Existing NLP solutions include speech analytics, transcription searching with keyword spotting, phonetics matching of audio files, and the like. While these solutions can be generally helpful for intent detection, they often require a fixed number of intent categories (e.g., "billing", "cancellation", "membership", etc.) for each type of call center. For solutions employed across a variety of call centers, these intent categories are unlikely to match, resulting in time-intensive "cold starts" to training the NLP solutions for the downstream tasks." Thus, customers must then define the categories they wish to identify, categorize a sufficient number of calls, and then train the model.

SUMMARY

The present invention relates to the field of computer technologies, and particularly, to devices, systems, and methods for intelligent conversational intent detection. Below, several examples are presented as some of the many examples disclosed elsewhere herein. As such, no further limitations should be inferred from their order or their noted features. In fact, numerous (e.g., all) the features from these examples and those disclosed elsewhere herein can be combined without departing from the scope of this disclosure.

A first example of examples disclosed herein is a computer-implemented method intelligent conversational intent detection. The method can include acquiring a conversational transcript input that is requested for intent detection. The conversational transcript input can include one or more conversational transcript segments. The method can include inputting the conversational transcript input into a model configured to decipher a conversational intent segment. The conversational intent segment can correspond to which of the one or more conversational transcript segments is likely to indicate a conversational intent of the conversational transcript input based on the intent detection. The method can include returning to a user the conversational intent segment.

In examples, the conversational transcript input can include one or more conversational transcripts. In examples, the one or more conversational transcript segments can include one or more transcript utterances, grouped transcript utterances, or transcript utterance portions. In examples, the conversational intent segment can include the one or more conversational transcript segments that is most likely to indicate the conversational intent.

Continuing with the first example, the conversational transcript input can include a plurality of conversational transcripts such that the conversational intent segment indicates an aggregate conversational intent of the plurality of conversational transcripts. In examples, the conversational transcript input can include a plurality of conversational transcripts. The method can include parsing the plurality of conversational transcripts into individual conversational transcripts such that the conversational intent segment indicates the conversational intent of each of the individual conversational transcripts. In examples, the model can be configured to aggregate each of the conversational intent segments into intent categories that are either provided to the model or determined by the model itself.

In a second example of examples disclosed herein, a data processing system for intelligent intent detection can include a memory for storing one or more modules and a processor configured to access the memory. The processor can be configured to process an acquisition module, an input module, and a results module. The acquisition module can be configured to acquire a conversational transcript input that is requested for the intent detection, the conversational transcript input comprising one or more conversational transcript segments. The input module can be configured to input the conversational transcript input into a model configured to decipher a conversational intent segment. The conversational intent segment can correspond to which of the one or more conversational transcript segments is likely to indicate a conversational intent of the conversational transcript input based on the intent detection. The results module can be configured to return to a user the conversational intent segment.

In examples, the data processing system can be a server running a private cloud platform or a multi-tenant platform. In examples, the model can be an intelligent natural language processing model comprising a text-to-text transfer transformer. In examples, the data processing system can include a display that is configured to present the conversational intent segment from the results module.

Continuing with the second example, the model can be configured to assign a probability value to the conversational intent segment. The probability value can correspond to a likelihood that the conversational intent segment indicates the conversational intent of the conversational transcript input. The conversational intent segment can have a probability value that indicates that the conversational intent segment is the most likely to represent the conversational intent.

In a third example, the present disclosure includes a non-transitory computer-readable medium that stores instructions that, when executed by one or more processors, causes the one or more processors to perform one or more functions. The instruction can cause the processor to acquire a conversational transcript input that is requested for intent detection. The conversational transcript input can include one or more conversational transcript segments. The instruction can cause the processor to input the conversational transcript input into a model configured to decipher a conversational intent segment. The conversational intent segment can correspond to which of the one or more conversational transcript segments is likely to indicate a conversational intent of the conversational transcript input based on the intent detection. The instruction can cause the processor to return to a user the conversational intent segment.

Additional features and advantages of the present disclosure will become apparent to those skilled in the art upon consideration of the following detailed description of the illustrative examples exemplifying the disclosure as presently perceived.

BRIEF DESCRIPTION OF THE DRAWINGS

The above-mentioned and other features and advantages of this disclosure, and the manner of obtaining them, will become more apparent, and will be better understood by reference to the following description of the exemplary examples taken in conjunction with the accompanying drawings, wherein:

FIG. 1 is a flowchart of a method for intelligent conversational intent detection, according to principles of the present disclosure.

Figure 2:
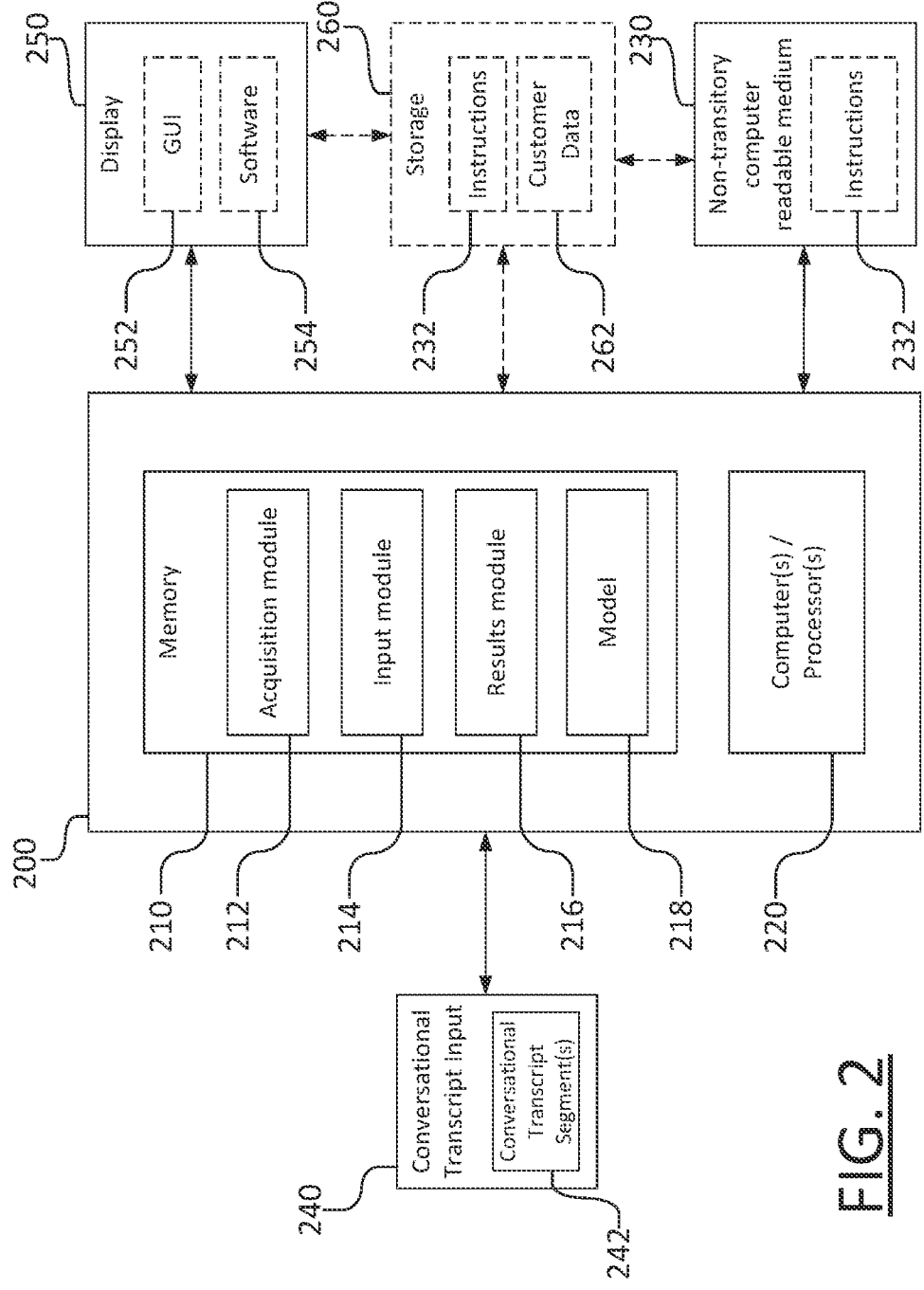
FIG. 2 is a block diagram schematic representation of a data processing system, according to principles of the present disclosure.

Corresponding reference characters indicate corresponding parts throughout the several views. Although the drawings represent examples of various features and components according to the present disclosure, the drawings are not necessarily to scale and certain features can be exaggerated in order to better illustrate and explain the present disclosure. The exemplification set out herein illustrates an example of the invention, and such an exemplification is not to be construed as limiting the scope of the invention in any manner.

DETAILED DESCRIPTION OF THE DRAWINGS

For the purposes of promoting an understanding of the principles of the present disclosure, reference is now made to the examples illustrated in the drawings, which are described below. The exemplary examples disclosed herein are not intended to be exhaustive or to limit the disclosure to the precise form disclosed in the following detailed description. Rather, these exemplary examples were chosen and described so that others skilled in the art can utilize their teachings. It is not beyond the scope of this disclosure to have a number (e.g., all) the features in a given example to be used across all examples.

Disclosed herein are computer-implemented methods for intelligent conversational intent detection. Such methods can employ principles of artificial intelligence, including machine learning and natural language processing (NLP). For instance, examples disclosed herein can be useful in tasks relating to NLP solutions (e.g., Text-to-Text Transfer Transformer" ("T5"), Bidirectional Encoder Representations from Transformers (BERT), top-layered classification transformer-based architecture, and other transformer-based architectures). For example, some of these solutions employ transfer learning, where a model is first preliminarily trained using a large dataset for an upstream task before being further trained on a downstream task. Further, examples in the present disclosure can be useful in downstream learning or functioning of models employing T5 frameworks, including those that convert natural language problems into a text-to-text format.

In an example of intent detection, for software developers, principles of the present disclosure circumvent needs for numerous distinct models across varying call centers by identifying where (e.g., which portion of text, when in the conversation, etc.) in a transcript the intent is described rather than simply returning a condensed representation in simple categories, which can vary vastly across individual call centers. While resulting in a less condensed representation, such examples are more likely to work across a variety of call centers. Accuracy of the model and results thereof can be improved by importing (e.g., manually or automatically importing) into the model additional labeled examples of utterances, phrases, sentences, etc. where the label corresponds to an intent that has been determined for the labeled examples. In addition, or in alternative, feedback (e.g., user- or vendor-provided feedback) on successful or unsuccessful intent determinations can be used to improve the accuracy of the model. Aggregation or grouping of intent categories can be performed as a downstream task. More details for intelligent conversational intent detection are further discussed below.

As illustrated in the flowchart of FIG. 1, a method 100 of intelligent conversational intent detection is disclosed. According to principles of the present disclosure, at step 102, the method 100 can include acquiring a conversational transcript input that is requested for intent detection. As further discussed below, the conversational transcript input can include one or more conversational transcript segments. At step 104, the method 100 can include inputting the conversational transcript input into a model configured to decipher a conversational intent segment. The conversational intent segment can correspond to which of the one or more conversational transcript segments is likely to indicate a conversational intent of the conversational transcript input based on the intent detection. At step 106, the method 100 can include returning to a user the conversational intent segment. These steps and other optional steps, as indicated by the dashed lines, are discussed in further detail below.

As alluded to above, the method 100 can begin with a conversational transcript input, which can vary in form and which can be parsed into various segments at step 112. For instance, when the conversational transcript input includes a plurality of individual conversational transcripts, the method 100 can optionally include parsing the conversational transcript input into individual conversational transcripts. In some instances, such parsing into individual conversational transcripts may not be necessary, desirable, or both. In any of these instances or when the conversational transcript input begins as an individual conversational transcript, the method 100 can include parsing the conversational transcript input into the one or more conversational transcript segments. In examples, the one or more conversational transcript segments can include one or more transcript utterances, grouped transcript utterances, or transcript utterance portions. Utterances can include all forms of individual words or concatenated words (e.g., phrases, sentences, paragraphs, etc.). As implied, the conversational transcript segments can be and often are a subset of the conversational transcript and contain less utterances than the conversational transcript as a whole. In this regard, parsing the conversational transcript input into the one or more conversational transcript segments can be performed by the model or can be an upstream or downstream task in the method 100. Tokenization processes, which are discussed in further detail below, can be used to parse the conversational transcripts. Such processes can be helpful in removing unrelated portions, transcription errors, fillers (e.g., "umms" and "uhs"), and the like from the conversational transcript segments.

Principles of natural language processing can be used by the model to perform the intent detection. For discussion purposes, intent detection can include identifying where within a conversation the likely purpose of the conversation is expressly or implicitly stated. At call centers, which can receive copious amounts of calls and resulting transcripts per day, it is useful to reliably understand customers' intents to adequately inform downstream tasks, such as resolutions or analytics. In addition to parsing such a large data set, within the context of natural language conversations that occur during these calls, intents are diversely expressed, and novel intents will continually be presented. In this regard, the model can be an intelligent natural language processing model comprising a text-to-text transfer transformer. As such, intent detection can be achieved by employing artificial intelligence principles, such as machine learning or big data principles, into the model. Using a series of operations, the model can be trained to perform intent detection for both known and novel intents. In this regard, the model can return (e.g., via a GUI on a display) the most likely intent (potentially of several possible determined intents) to a user.

Various criteria can be used to inform the intent detection and to influence what results thereof are returned to the user. These criteria can include binary determinations, statistics such as ranges (e.g., confidence intervals, of optimized values) and thresholds, each of which can be indicative of how likely a given conversational transcript contains or indicates a conversational intent (e.g., based on the intent detection), and the like. In examples, the conversational intent segment can include the one or more conversational transcript segments that is most likely to indicate the conversational intent. In examples, the model can be configured to assign a probability value to the conversational intent segment. The probability value can correspond to a likelihood that the conversational intent segment indicates the conversational intent of the conversational transcript input. The probability value can be in the form of a list or array with a classifier that indicates a probability value (e.g., in binary or non-binary form such as a rate, number, amount, or fraction thereof) that corresponds to one or more (e.g., all) conversational transcript segments. In examples, the conversational intent segment can include the one or more conversational transcript segments that is most likely (e.g., has the highest probability) to indicate the conversational intent.

In examples, the model is configured to index where the conversational intent segment is in the conversational transcript input. Indexing can include determining where in the conversational intent segment is in the conversational transcript input based on an amount of resources (e.g., processing time, speed, and quantity) or other determinations (e.g., particular words, phrases, punctuations, and the like) made by the model. At step 114, the method 100 can include returning to the user the index corresponding to the conversational intent segment. Indexing can be performed via a tokenization process. In examples of such tokenization processes, one or more segments a conversational transcript (e.g., utterances, phrases, sentences, paragraphs, or an entire conversational transcript) is segmented into smaller units (known as tokens), such as individual words, utterances, or phrases.

Deciphering an aggregate conversational intent, at step 116 for instance, may be desirable in some instances. In examples, the model can be configured to aggregate each of the conversational intent segments into intent categories (e.g., individual words and/or lumped, verbatim, paraphrased, or summarized (e.g., condensed with unnecessary parts removed) phrases) that are either provided to the model or determined by the model itself. In examples, the conversational transcript input can include one or more conversational transcript input. In examples, the conversational transcript input can include a plurality of conversational transcripts such that the conversational intent segment indicates an aggregate conversational intent of the plurality of conversational transcripts. In examples, the conversational transcript input can include a plurality of conversational transcripts. The method 100 can include parsing the plurality of conversational transcripts into individual conversational transcripts such that the conversational intent segment indicates the conversational intent of each of the individual conversational transcripts.

A data processing system 200 for intelligent conversational intent detection, as shown in FIG. 2, can employ principles of the present disclosure. For example, a data processing system 200 for intelligent intent detection can include a memory 210 for storing one or more modules (e.g., an acquisition module 212, an input module 214, and a results module 216) and a model 218. In addition, or in alternative, the data processing system 200 can include a processor 220 or a computer 220 configured to access the memory 210. In this regard, exemplary procedures in accordance with the present disclosure described herein can be performed by a processing arrangement (e.g., one or more processors 220), a computing arrangement (e.g., one or more computers 220), or both. Such arrangements can be, e.g., entirely or a part of, or include, but not limited to, a computer 220, a processor 220, or both, each of which can include, e.g., one or more processors 220 (e.g., CPUs or microprocessors), and use a non-transitory computer-readable medium 230 (e.g., RAM, ROM, hard drive, or other storage device) with instructions 232 stored thereon. The processor 220 can be in communication with the display 250, which, according to some examples of the present disclosure, can be a touchscreen configured to input information to the processor 220 in addition to outputting information from the processor 220. Further, the display 250, the storage 260, or both can be used to display, store, or both display and store customer data 262 (e.g., conversation transcripts, categories, history of user input, etc.) in a format that is either or both user-readable and user-accessible. In examples, the data processing system 200 can be a server running a private cloud platform or a multi-tenant platform. As further discussed below, the data processing system 200 can include a display 250 that is configured to present the conversational intent segment from the results module 216.

Various procedures, at least some of which are similar to those in the previously discussed methods, are performed by the processor 220 in some examples. For instance, the processor 220 can be configured to process an acquisition module 212, an input module 214, and a results module 216. Input for the data processing system 200 can be a conversational transcript input 240 that includes conversational transcript segments 242. In examples, the conversational transcript input 240 can be provided via a storage device (e.g., a hard disk, floppy disk, memory stick, CD-ROM, RAM, ROM, etc., or a collection thereof) or user input (e.g., via the display 250). The acquisition module 212 can be configured to acquire a conversational transcript input 240 that is requested for the intent detection, the conversational transcript input 240 comprising one or more conversational transcript segments. The input module 214 can be configured to input the conversational transcript input 240 into a model 218 configured to decipher a conversational intent segment. The model 218 can be stored in the memory 210 or otherwise in communication with the memory 210, the processor 220, or both. The conversational intent segment can correspond to which of the one or more conversational transcript segments is likely to indicate a conversational intent of the conversational transcript input 240 based on the intent detection. The results module 216 can be configured to return to a user the conversational intent segment.

The display 250 can include a graphic user interface 252 (GUI 252) and a software 254 as further described below. In examples, the display 250 is configured to present the conversational intent (e.g., as a ranked/ordered list, matrix, or the like) from the results module 216 For instance, as noted above, the conversational intent segment can include the one or more conversational transcript segments that is most likely to indicate the conversational intent. Continuing with this example, the results module 216 can be configured to return to the candidate conversational intent segments, each of which is less or equally likely to indicate the conversational intent. The results module 216 can be configured to return to the user an ordered list comprising the conversational intent segment and the candidate conversational intent segments in order of likelihood that the conversational intent is indicated therein.

User intervention with the model 218 can be facilitated via the display 250. For example, the display 250 can include software 254 in communication with the server and the GUI 252 with which to prompt a user and receive a user input (e.g., an analog or digital input). In examples, the display 250 is configured to optionally allow for user input to confirm or modify the inputs and results from the processor 220, modify criteria used by the processor 220, or trigger subsequent runs of the model 218. Of course, in other examples, the display 250 can be configured to allow any combination of these functions and more as these functions are just some of many examples one skilled in the art would appreciate.

With continued reference to FIG. 2, a non-transitory computer-readable medium 230 is also included in the present disclosure. The non-transitory computer-readable medium 230 can store instructions 232 that, when executed by one or more processors 220, can cause the one or more processors 220 to perform one or more functions. The instruction can cause the processor 220 to acquire a conversational transcript input 240 that is requested for intent detection. The conversational transcript input 240 can include one or more conversational transcript segments. The instruction can cause the processor 220 to input the conversational transcript input 240 into a model 218 configured to decipher a conversational intent segment. The conversational intent segment can correspond to which of the one or more conversational transcript segments is likely to indicate a conversational intent of the conversational transcript input 240 based on the intent detection. The instruction can cause the processor 220 to return to a user the conversational intent segment.

The instructions 232 can cause the processor 220 to parse the conversational transcript input 240 into the one or more conversational transcript segments. The conversational transcript input 240 can include one or more conversational transcripts. The model 218 can be an intelligent natural language processing model 218 comprising a text-to-text transfer transformer.

In examples, the model 218 can be configured to assign a probability value to the conversational intent segment. The probability value can correspond to a likelihood that the conversational intent segment indicates the conversational intent of the conversational transcript input 240. In examples, the conversational intent segment can include the one or more conversational transcript segments that is most likely to indicate the conversational intent. The conversational intent segment can include the one or more conversational transcript segments that is most likely to indicate the conversational intent.

It is well understood that methods that include one or more steps, the order listed is not a limitation of the claim unless there are explicit or implicit statements to the contrary in the specification or claim itself. It is also well settled that the illustrated methods are just some examples of many examples disclosed, and certain steps can be added or omitted without departing from the scope of this disclosure. Such steps can include incorporating devices, systems, or methods or components thereof as well as what is well understood, routine, and conventional in the art.

The connecting lines shown in the various figures contained herein are intended to represent exemplary functional relationships and/or physical couplings between the various elements. It should be noted that many alternative or additional functional relationships or physical connections can be present in a practical system. However, the benefits, advantages, solutions to problems, and any elements that can cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an example, B alone can be present in an example, C alone can be present in an example, or that any combination of the elements A, B or C can be present in a single example; for example, A and B, A and C, B and C, or A and B and C.

In the detailed description herein, references to "one example," "an example," "an exemplary example," etc., indicate that the example described can include a particular feature, structure, or characteristic, but every example can not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art with the benefit of the present disclosure to affect such feature, structure, or characteristic in connection with other examples whether or not explicitly described. After reading the description, it will be apparent to one skilled in the relevant art(s) how to implement the disclosure in alternative examples.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus While the present disclosure has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A computer-implemented method for intelligent conversational intent detection, the computer-implemented method comprising:

acquiring a conversational transcript input that is requested for intent detection, the conversational transcript input comprising one or more conversational transcript segments;

inputting the conversational transcript input into a model configured to:

decipher a conversational intent segment corresponding to which of the one or more conversational transcript segments is likely to indicate a conversational intent of the conversational transcript input based on the intent detection;

index where the conversational intent segment is in the conversational transcript input; and return to the user the index corresponding to the conversational intent segment; and returning to a user at least one of the conversational intent segment, wherein at least one of:

the model is an intelligent natural language processing model comprising a text-to-text transfer transformer, and wherein the model is further configured to index a location of the conversational intent segment in the conversational transcript input, assign a probability value to the conversational intent segment, and adjust the probability value based on at least one of a user-specific parameter and a session-specific parameter derived from prior user interaction history or session metadata indicating conversational drift; and the conversational transcript input comprises a one or more conversational transcripts such that the conversational intent segment indicates an aggregate conversational intent of the plurality of conversational transcripts, and wherein the model is further configured to: (i) generate a set of counterfactual conversational segments from the conversational transcript input that are semantically similar to the conversational intent segment and preserve contextual relationships from the original transcript and (ii) assign sentiment-based scores to each of the counterfactual conversational segments such that the conversational intent segment is returned based on a comparative ranking of the sentiment-based scores.

2. The computer-implemented method of claim 1, further comprising parsing the conversational transcript input into the one or more conversational transcript segments.

3. The computer-implemented method of claim 2, wherein the model is further configured to parse the conversational transcript input into the one or more conversational transcript segments, and wherein parsing the conversational transcript input into the one or more conversational transcript segments is performed by the model.

4. The computer-implemented method of claim 2, wherein the one or more conversational transcript segments comprises one or more transcript utterances, grouped transcript utterances, or transcript utterance portions.

5. The computer-implemented method of claim 1, wherein the conversational intent segment comprises the one or more conversational transcript segments that is most likely to indicate the conversational intent.

6. The computer-implemented method of claim 1, wherein the model is further configured to index where the conversational intent segment is in the conversational transcript input, and wherein the computer-implemented method further comprises returning to the user the index corresponding to the conversational intent segment.

7. The computer-implemented method of claim 1, wherein the model is further configured to assign a probability value to the conversational intent segment, the probability value corresponding to a likelihood that the conversational intent segment indicates the conversational intent of the conversational transcript input, and wherein the conversational intent segment is the most likely intent.

8. The computer-implemented method of claim 1, wherein the one or more conversational transcripts comprises a plurality of conversational transcripts.

9. The computer implemented method of claim 8, wherein the conversational transcript input comprises a plurality of conversational transcripts, and wherein the computer-implemented method further comprises parsing the plurality of conversational transcripts into individual conversational transcripts such that the conversational intent segment indicates the conversational intent of each of the individual conversational transcripts.

10. The computer implemented method of claim 9, wherein the model is further configured to aggregate each of the conversational intent segments into intent categories that are either provided to the model or determined by the model itself.

11. A data processing system for intelligent intent detection, the data processing system comprising:

a memory for storing one or more modules;

a processor configured to access the memory and to process:

an acquisition module that is configured to acquire a conversational transcript input that is requested for the intent detection, the conversational transcript input comprising one or more conversational transcript segments;

an input module that is configured to input the conversational transcript input into a model configured to decipher a conversational intent segment, the conversational intent segment corresponding to which of the one or more conversational transcript segments is likely to indicate a conversational intent of the conversational transcript input based on the intent detection; and a results module that is configured to return to a user the conversational intent segment, wherein the model is an intelligent natural language processing model comprising a text-to-text transfer transformer, and wherein the model is further configured to index a location of the conversational intent segment in the conversational transcript input, assign a probability value to the conversational intent segment, and adjust the probability value based on at least one of a user-specific parameter and a session-specific parameter derived from prior user interaction history or session metadata indicating conversational drift.

12. The data processing system of claim 11, wherein the data processing system is a server running a private cloud platform or a multi-tenant platform.

13. The data processing system of claim 11, wherein the conversational intent segment comprises the one or more conversational transcript segments that is most likely to indicate the conversational intent.

14. The data processing system of claim 13, wherein the results module is further configured to return to the candidate conversational intent segments, each of which is less or equally likely to indicate the conversational intent, and to return to the user an ordered list comprising the conversational intent segment and the candidate conversational intent segments in order of likelihood that the conversational intent is indicated therein.

15. The data processing system of claim 11, further comprising a display that is configured to present the conversational intent segment from the results module.

16. A non-transitory computer-readable medium that stores instructions that, when executed by one or more processors, causes the one or more processors to:

acquiring a conversational transcript input that is requested for intent detection, the conversational transcript input comprising one or more conversational transcript segments;

inputting the conversational transcript input into a model configured to decipher a conversational intent segment, the conversational intent segment corresponding to which of the one or more conversational transcript segments is likely to indicate a conversational intent of the conversational transcript input based on the intent detection; and returning to a user the conversational intent segment, wherein the model is further configured to:

generate a set of counterfactual conversational segments from the conversational transcript input that are semantically similar to the conversational intent segment and preserve contextual relationships from the original transcript, and assign sentiment-based scores to each of the counterfactual conversational segments such that the conversational intent segment is returned based on a comparative ranking of the sentiment-based scores.

17. The non-transitory computer readable medium of claim 16, wherein the instructions, when executed by the one or more processors, further cause the one or more processors to parse the conversational transcript input into the one or more conversational transcript segments, wherein the conversational transcript input comprises one or more conversational transcripts, and wherein the model is an intelligent natural language processing model comprising a text-to-text transfer transformer.

18. The non-transitory computer readable medium of claim 16, wherein the model is further configured to assign a probability value to the conversational intent segment, the probability value corresponding to a likelihood that the conversational intent segment indicates the conversational intent of the conversational transcript input, and wherein the conversational intent segment comprises the one or more conversational transcript segments that is most likely to indicate the conversational intent.

* * * * *